United States Patent Office 2,957,908
Patented Oct. 25, 1960

2,957,908

STABILIZATION OF HYPERBASIC MAGNESIUM SULFONATES

Morris A. Wiley and Herman D. Kluge, Fishkill, N.Y., assignors to Texaco Inc., a corporation of Delaware No Drawing. Filed Dec. 13, 1957, Ser. No. 702,546

11 Claims. (Cl. 260—504)

The instant invention relates to hyperbasic magnesium sulfonate compositions protected from instability in storage such as scum or gel formation and process therefor.

By a hyperbasic sulfonate we mean one wherein no promoter such as an alkyl phenol or an amine or a low molecular weight acid or the like is used in its preparation, yet the ratio of filterably dispersed and/or combined alkaline earth metal to sulfonic acid equivalent in the composition is substantially above that present in the corresponding normal alkaline earth metal sulfonate.

The normal magnesium salt formula of a monosulfonic acid can be written $(RSO_3)_2Mg$, $RSO_3$ standing for the sulfonate radical. Generally the hyperbasic magnesium sulfonate has two or more times and it can have as many as about 8 times the metal content of the normal salt. For purposes of this invention prior art "basic" magnesium sulfonates, e.g., as shown in U.S. Patent 2,585,520, are treated herein as one kind of hyperbasic magnesium sulfonate.

While not intending to be bound by any theory as to the chemical constitution of a hyperbasic sulfonate, it is our opinion that the excess magnesium metal over and above that present in the corresponding normal salt is preponderantly in the form of filterable, exceedingly finely dispersed inorganic magnesium compounds such as the carbonate (if, in the preparation, the product has been treated with carbon dioxide); the sulfide or hydrosulfide (if, in the preparation the product has been treated with $H_2S$); or the hydroxide (if, in the preparation, the product has been dehydrated in the presence of an inert gas.) It is possible, however, that some sort of complex compound exists in the hyperbasic magnesium sulfonate product. Ways of preparing hyperbasic magnesium sulfonates and keeping such products storage stable, i.e., scum-free and gel-free, are shown in the copending patent application of Herman D. Kluge and Morris A. Wiley entitled "Preparation of Hyperbasic Sulfonates," application Serial No. 702,547, U.S. Patent No. 2,920,105, filed simultaneously herewith.

Magnesium sulfonates ordinarily are handled in a water-immiscible medium such as a mineral oil or one of the synthetic lubricants. The normal magnesium oil-soluble sulfonate can ordinarily be handled and stored with incidental or steady exposure to ordinary atmosphere, remaining desirably bright and clear without any appreciable loss of dispersed metal content. However, the hyperbasic magnesium sulfonate rapidly forms a surface film or scum on exposure to ordinary atmosphere which scum; in addition to being undesirable in an additive for lubricants, also makes blending and processing difficult and indicates a loss of dispersed metal content. On prolonged storage with incidental or steady exposure to ordinary atmosphere, the hyperbasic magnesium sulfonate can gel entirely and can become hazy in appearance so that handling, blending, and processing becomes difficult if not impossible. While it is possible to build special equipment for handling hyperbasic magnesium sulfonates so as to protect them from such storage instability, the construction is ordinarily an unwarranted expense in a plant making a diversity of related lubricating oil additives; moreover such construction is impractical because the maker usually has little or no control over the environment of his hyperbasic magnesium sulfonate after it leaves the special handling of his plant.

Our process permits one to handle the hyperbasic magnesium sulfonate in contact with the ordinary ambient atmospheric conditions of processing, of storage, and of use without formation of surface films, scum, gel, or precipitate, and our product maintains its fresh bright appearance and initial metal value upon atmospheric exposure in the processing and storage.

Our process comprises blending, advantageously at a temperature of at least about 100° F. and preferably at a temperature of 150–300° F. with vigorous agitation, the oil-soluble hyperbasic magnesium sulfonate with an oil-soluble metal salt of a coupled phenol selected from the group consisting of calcium and magnesium salts. These phenolates can be, for example, the normal salt (wherein there is a mol of calcium or magnesium in a mol of the metal coupled phenolate) or the basic salt, (wherein there are two mols of calcium or magnesium in a mol of the metal coupled phenolate), or the phenolates can be mixed normal and basic phenolates.

The coupled phenol itself (which can be used in making suitable calcium or magnesium coupled phenolates for the practice of our invention) can be an alkylated hydroxy phenyl radical bridged by a linkage including methylene groups or like groups to another alkylated hydroxy phenyl radical, the alkylated hydroxy phenyl radicals being of the same or different molecular weights. Thus, for example, typical useful oil-soluble coupled phenols are the condensation products of a higher alkyl phenol with hexamethylene tetramine, or with formaldehyde and ethylene diamine, or simple with formaldehyde itself. A characteristic thing about such coupled phenols is the bridge comprising methylene or like radicals between the aromatic rings, e.g., a saturated open chain of carbon atoms or carbon and nitrogen atoms.

The ratio of hyperbasic magnesium sulfonate to the calcium and/or magnesium coupled phenolate in the stabilized blend is made up to furnish at least one molar part of metal (calcium or magnesium) from said phenolate per 10 molar parts of magnesium from the hyperbasic magnesium sulfonate, and is, even more advantageously, at least one molar part of metal from said phenolate per 5 molar parts of magnesium from said hyperbasic sulfonate. Accordingly, in speaking of blending ratios of the phenolate to the sulfonate in this application we mean the relative molar proportions of metal (calcium and/or magnesium) from the phenolate and from the sulfonate as dispersed in the resulting mixture.

Our storage stable lubricant additive has 1–10 parts of said hyperbasic sulfonate per one part of an oil-soluble magnesium or calcium salt of said condensation product, said proportions being based upon the total metal contents in said sulfonate and in said magnesium or calcium salt of the condensation product. A special and fortuitous result of the lubricant additive obtained by this blending is that the aforementioned two metal-containing ingredients complement each other in detergent action. The metal contents of the said magnesium salts of the condensation products (coupled phenolates), used to stabilize the said hyperbasic magnesium sulfonate, contribute a detergent action which permits a reduction in the total amount of hyperbasic magnesium sulfonate which must be incorporated in a lubricating oil for a given quality level which is suitable for a particular type of internal combustion engine service. While it is possible to stabilize hyperbasic magnesium sulfonates with various polar organic materials, such as fatty alcohols, amines, etc., as shown in the copending patent application of Herman D. Kluge and Morris A. Wiley entitled "Preparation of Hyperbasic Sulfonates," application Serial No. 702,547, filed simultaneously herewith, such polar organic materials represent a disadvantageous additional cost for raw materials which do not contribute to the stabilized hyperbasic magnesium sulfonate product any metal content or alkaline earth metal content capable of dispersing and/or neutralizing the harmful acids formed by oxidation of sulfur in the fuel, by incomplete combustion of the fuel, or by oxidation of the lubricating oil itself.

Preparation of the coupled phenolate of a higher alkyl phenol (one where the alkyl group, or at least one of the alkyl groups if there are a plurality of alkyl groups contains between 5 and 70 carbon atoms) with hexamethylene tetramine can be done according to the method shown in U.S. Patents 2,340,036, and 2,410,911. The corresponding magnesium salts can be made by reacting 0.5 to 6 and preferably 0.5 to 2 mols of magnesium as an alcoholate or other reactive form of magnesium with a mol of the condensation product in a medium of hydrocarbon oil or other water-immiscible organic medium, stripping off the solvent (optionally in the presence of gaseous $CO_2$ or $N_2$) and filtering off insoluble materials. It may be desirable to steam the product to hydrolyze any remaining magnesium alcoholate if Mg alcoholate is used. The phenolic condensation product with hexamethylene tetramine is thought to be predominantly alkylated di-(2-hydroxy benzyl) amine having the formula

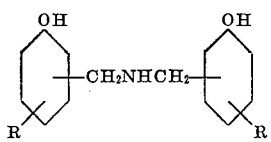

The corresponding normal magnesium salt is believed to have essentially the following structure:

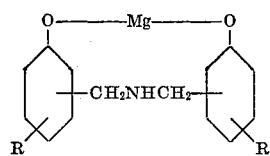

In the above formulae the alkyl group is a higher alkyl radical, that is R has 5–70 carbon atoms. In the preferred so-coupled phenol the alkyl group is ordinarily para to the phenolic oxygen, making the phenolic product a di-(2-hydroxy-5-alkylbenzyl) amine.

Preparation of other suitable coupled phenolates, namely, normal and basic magnesium alkyl phenol-formaldehyde-ethylene diamine condensation products is described in U.S.P. 2,725,358. Preparation of still another typical coupled phenolate useful in the practice of our invention, namely, a calcium salt of an alkyl phenol-formaldehyde condensation product, is shown in U.S.P. 2,647,873.

Preparation of alkyl phenol-formaldehyde-ethylene diamine condensation products is also described in U.S. Patents 2,459,113 and 2,459,114. These condensation products can be converted to corresponding calcium and magnesium salts by conventional means. Broadly such phenol condensation products are N,N'-bis(2-hydroxy-5-alkylbenzyl)-1,2-diaminoethanes. Structure of the alkyl phenol - formaldehyde - ethylene diamine condensation product can be represented as follows (the R groups being alkyl groups as represented in the formulae shown hereinbefore):

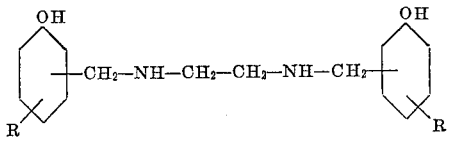

Structure of an alkyl phenol-formaldehyde product can be represented as follows:

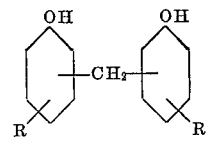

In the normal salt formulae corresponding to the above two kinds of coupled phenols the two hydroxyl hydrogens are removed and the hydroxyl oxygens joined to divalent calcium or magnesium. The basic salts are represented in corresponding formulae by removing the hydroxyl hydrogens and appending the monovalent radical-MgOH or -CaOH to each of the hydroxyl oxygens.

When more than 10 parts of the hyperbasic sulfonate are blended with one part of the magnesium or calcium salt of the coupled phenol (molar metal basis), cloudiness or even formation of heavy intractable scum is likely to begin almost immediately in ordinary atmospheres. Accordingly, such high ratios of the hyperbasic sulfonate to the metal coupled phenolate are to be avoided. Advantageously 3–5 parts of the sulfonate per part of coupled phenolate and preferably about 4 parts of the sulfonate per part of the coupled phenolate are used.

For obtaining the lubricant additive having the most nearly optimum proportions of the metal (calcium or magnesium) coupled phenolate and hyperbasic magnesium sulfonate for most effective detergent action from these ingredients, the blending ratio of hyperbasic sulfonate to coupled phenolate should not be substantially below about 1:1 (molar metal content basis), and it is preferably about 4:1.

The hyperbasic magnesium sulfonate ordinarily is in concentration of 10 to 60 weight percent (measured as magnesium sulfonate itself) in an oily, water-immiscible organic medium, which in most cases will be a petroleum hydrocarbon oil, that is, a mineral oil or a synthetic hydrocarbon fraction such as a lubricating oil fraction, a gas oil fraction, or an even lighter cut such as benzene; alternatively, the organic medium can be all or in part a synthetic lubricant or diluent such as di-2-ethylhexyl sebacate, a polyoxyalkylene glycol of mol weight between about 200 and 4000, a polymerized olefin dioctyl phthalate, trioctyl phosphate, polymeric tetrahydrofuran, or a polyalkylsilicone polymer having mol weight in the range of 200 to 5000. By "water-immiscible" we mean that the solubility of water in the medium is less than 5 percent by weight at room temperature and pressure.

The magnesium or calcium coupled phenolate is also ordinarily supplied as a 10 to 60 weight percent (of calcium or magnesium coupled phenolate) concentrate in the same or a similar organic medium as the hyperbasic magnesium sulfonate. The blending of these two oil-soluble dispersions is done by conventional mixing, preferably protected from atmospheric exposure until thorough mixing has been obtained. The resulting blend, optionally cut with additional water-immiscible medium prior to, during, or after the mixing will have broadly between 0.5 and 5.0 percent by weight total metal combined and/or dispersed in clear, bright mixture in the water-immiscible medium. In this state it is suitable for subsequent blending with lubricant such as a mineral lubricating oil to give a lubricant composition from 0.01 to 1.0 weight percent total metal.

The following examples show ways in which our invention has been practiced, but should not be construed as limiting the invention.

The hyperbasic oil-soluble magnesium petroleum sulfonate was made for the following tests in this manner: into an agitated reactor was charged 785 parts of normal magnesium petroleum sulfonate concentrate in a naphthene base hydrocarbon diluent oil, the concentrate containing 0.5 mol of the normal sulfonate (comprising one equivalent of petroleum sulfonic acid and amounting to approximately 470 parts of said concentrate, the diluent oil being approximately 315 parts of said concentrate and having viscosity of about 100 S.S.U. at 210° F.). Also charged was: 429 parts of a solution of magnesium ethoxy ethanolate in 2-methoxy ethanolate ("Methylcellosolve") vehicle, said solution containing 1.25 mols of magnesium; and 869 parts of naphthene base hydrocarbon oil diluent having viscosity in the range of 96–104 S.S.U. at 100° F. Water content of the normal magnesium sulfonate starting material was 0.46% by weight of the normal magnesium sulfonate concentrate.

This reaction mixture was heated to 350° F. while blowing with nitrogen at a rate of about ¼ s.c.f.h. per pound of initial reaction mixture. Then the stripping gas was switched to $CO_2$ and the mixture blown at 350° F. for 4 hours at double the initial nitrogen rate. Afterwards this mixture was blown for an additional hour with nitrogen at the initial rate.

Additional liquid water was then added to the reaction mixture, the added water being sufficient to hydrolyze about 1½ times the magnesium methoxy ethanolate remaining in the reaction mixture, the water being added in a solvent of 114 parts of "Methylcellosolve" to obtain smooth dispersal in the hot mixture. The mixture was then further blown at 350° F. with nitrogen at the initial rate for one hour whereby virtually all the "Methylcellosolve" was stripped from the reaction mixture. It was filtered hot. The resulting hyperbasic magnesium sulfonate was a bright, clear product containing 1.75 mols (3.50 equivalents) of magnesium per equivalent of sulfonic acid employed.

A sample of this hyperbasic sulfonate was placed in an open container in contact with ordinary atmosphere. After a few hours a surface film or scum was observed on the sample. The sample was allowed to stand for two days at normal room conditions, then was stirred and heated to 120° F. to attempt homogenization, but the surface film did not become completely dispersed and the sample was not complete homogeneous. Five parts of the stirred sample were then added to 95 parts of an S.A.E. 10 grade lubricating oil, and the mixture was heated to 150° F. with stirring; the resulting oil composition contained undispersed particles of the additive.

Example 1.—The oil-soluble basic magnesium alkyl phenolate used in the following example was made by first reacting: 3366 grams (12 mols) of an alkyl phenol (made by alkylating phenol with $C_{10+}$ propylene polymer fraction using $BF_3$ catalyst) and 280 grams (2 mols) of hexamethylene tetramine in a diluent medium of 5418 grams of a pale oil (a paraffinic base refined hydrocarbon oil having 96–104 S.S.U. viscosity at 100° F.). The mixture was stirred for eight hours at 120° C. Then 6020 grams of this hexamethylene tetramine-alkyl phenol product (4 mols) and 2740 grams of magnesium methoxy ethanolate ("Methylcellosolvate") containing 8 mols of magnesium were mixed together and blown for two hours at 350° F. using nitrogen gas, then further blown for two hours at the same temperature with $CO_2$ at the flow rate of 4 liters a minute, and filtered. The dispersed magnesium in the filtered coupled phenolate product was 2.97% by weight.

A portion (39 grams containing 0.04 of a mol of magnesium) of the hyperbasic magnesium sulfonate was heated to 300° F. and mixed with 8.2 grams (containing 0.01 of a mol of magnesium) of the $CO_2$-blown basic magnesium coupled phenolate product of hexamethylene tetramine and $C_{10+}$ alkyl phenol—hereinbefore described. The resulting stabilized hyperbasic magnesium sulfonate concentrate remained stable on exposure to atmosphere, the conditions being the same as those shown above which caused the unstabilized hyperbasic magnesium sulfonate to form a surface film. After standing overnight at 5 gram portion of this so-stabilized hyperbasic magnesium sulfonate concentrate was blended with 95 grams of the previously-described S.A.E. 10 grade base oil while heating the mixture to 150° F. with stirring. The resulting lubricating oil composition was completely homogeneous, fluid, and bright, and it remained so upon exposure to atmosphere.

Example 2.—In this preparation the coupled phenol used was made from an alkyl phenol-formaldehyde-ethylene diamine condensation product, the phenol having average mol weight of 499 and the average alkyl group on the phenol being about $C_{29}$ from a butylene polymer; the condensation and formation of the normal magnesium salt was done in a manner similar to the preparation shown in Example 1 of U.S.P. 2,725,358, and the coupled phenol contained 1.21% magnesium. Five grams of this normal magnesium coupled phenolate was blended with 20 grams of the basic magnesium sulfonate, the blending mol ratio being 4 mols of magnesium from the sulfonate per mol of magnesium from the coupled phenolate. The mixture was exposed to atmospheric conditions in an open container for two days, and it showed no evidence of instability.

Example 3.—A portion of 5 grams of the hyperbasic magnesium sulfonate and 5 grams of the oil-soluble normal magnesium coupled phenolate used in Example 2 were blended into an additive concentrate, the mol ratio of magnesium from the sulfonate to magnesium from the coupled phenolate being 1:1. The resulting additive concentrate remained fluid and bright in ordinary atmospheric exposure for eight days of observation.

Example 4.—The coupled phenolate used in this example was a commercial grade of normal calcium salt of an octyl phenol-formaldehyde coupled product of the type shown in U.S. Patent 2,647,873. A portion of the hyperbasic sulfonate was agitated with said calcium coupled phenolate while heating to a temperature of 300° F. to give a blend having 7.61 mols of magnesium from the sulfonate per mol of calcium from the calcium coupled phenolate. This stabilized concentrate remained fluid and bright on standing exposed to atmosphere for 12 days of observation. It was then exposed in 100% humidity storage where it remained stable for eight days of observation.

Example 5.—Portions of the hyperbasic magnesium sulfonate and $CO_2$-blown basic magnesium salt of the alkyl phenol-hexamethylene tetramine condensation product used in Example 1 were blended together by heating to 300° F. with stirring to give a lubricating oil additive concentrate having 2.04 mols of magnesium furnished by the sulfonate per mol of magnesium furnished by the coupled phenolate. This concentrate was observed to remain fluid and bright for 5 days' exposure to ordinary atmosphere, then for 12 days' exposure to 100% humidity conditions.

We claim:
1. A method of improving the storage-keeping properties of a hyperbasic magnesium sulfonate which forms a surface film on exposure to the atmosphere, comprising blending said sulfonate with an oil-soluble alkaline earth metal salt of an oil-soluble coupled phenol, said metal being selected from the group consisting of calcium and magnesium, the metal salt being employed in a ratio of at least one mol of metal from the metal salt per 10 mols of magnesium from said hyperbasic sulfonate, thereby preventing the formation of surface film on the resulting mixture.

2. A method according to claim 1, wherein the metal salt is employed in the ratio of 1 mol of metal per 3 to 5 mols of magnesium from said hyperbasic sulfonate.

3. A hyperbasic magnesium sulfonate concentrate having improved storage-keeping properties on exposure to the atmosphere, said concentrate comprising a hyperbasic magnesium sulfonate and an oil-soluble alkaline earth metal salt of an oil-soluble coupled phenol, the metal portion of which is selected from the group consisting of calcium and magnesium, said concentrate containing said metal salt in a ratio of at least one mol of metal from the metal salt per 10 mols of magnesium from said hyperbased magnesium sulfonate.

4. A concentrate according to claim 3, wherein the metal salt of the coupled phenol is present in a ratio of one mol of metal per 3 to 5 mols of magnesium from said hyperbased sulfonate.

5. The method of claim 1 wherein said coupled phenolate is a magnesium phenolate.

6. The method of claim 1 wherein said coupled phenolate is a calcium phenolate.

7. The concentrate of claim 3 wherein the coupled phenolate is a magnesium coupled phenolate.

8. The concentrate of claim 3 wherein the coupled phenolate is a calcium coupled phenolate.

9. The concentrate of claim 3 wherein the salt of the coupled phenol is a magnesium salt of di-(2-hydroxy-5-alkylbenzyl) amine wherein the alkyl group is a $C_{10+}$ propylene polymer fraction.

10. The concentrate of claim 3 wherein the salt of the coupled phenol is a magnesium salt of N,N'-bis(2-hydroxy-5-alkyl benzl)-1,2-diaminoethane wherein the alkyl group contains an average of about 29 carbon atoms.

11. The concentrate of claim 3 wherein the salt of the coupled phenol is a calcium salt of di-(hydroxy-octylphenyl) methane.

References Cited in the file of this patent

UNITED STATES PATENTS

| | | |
|---|---|---|
| 2,467,176 | Zimmer et al. | Apr. 12, 1949 |
| 2,616,924 | Asseff et al. | Nov. 4, 1952 |
| 2,617,049 | Asseff et al. | Nov. 4, 1952 |
| 2,695,910 | Asseff et al. | Nov. 30, 1954 |
| 2,767,209 | Asseff et al. | Oct. 16, 1956 |
| 2,777,874 | Asseff et al. | Jan. 15, 1957 |